United States Patent
Li

(10) Patent No.: US 12,132,848 B2
(45) Date of Patent: Oct. 29, 2024

(54) SCREEN CONTROL METHOD, TERMINAL, AND STORAGE MEDIUM

(71) Applicant: VIVO MOBILE COMMUNICATION CO., LTD., Chang'an Dongguan (CN)

(72) Inventor: Jiayu Li, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 576 days.

(21) Appl. No.: 17/360,253

(22) Filed: Jun. 28, 2021

(65) Prior Publication Data

US 2021/0329112 A1    Oct. 21, 2021

Related U.S. Application Data

(63) Continuation of application No. PCT/CN2019/125025, filed on Dec. 13, 2019.

(30) Foreign Application Priority Data

Dec. 26, 2018  (CN) ......................... 201811603117.3

(51) Int. Cl.
   *H04M 1/02*   (2006.01)
(52) U.S. Cl.
   CPC ....... *H04M 1/0264* (2013.01); *H04M 1/0216* (2013.01); *H04M 1/0268* (2013.01)
(58) Field of Classification Search
   CPC ............. H04M 1/0245; H04M 1/0216; H04M 1/0266; H04M 1/0268; H04M 1/0264; G09G 2380/02; G09G 2320/0261; G09G 3/3208; G06F 1/1652; G06F 1/1686; G06F 1/165; H04N 5/2257
   See application file for complete search history.

(56) References Cited

U.S. PATENT DOCUMENTS

| | | | |
|---|---|---|---|
| 2017/0154609 A1 | 6/2017 | Yoon et al. | |
| 2018/0198896 A1* | 7/2018 | Kang | ................... G06F 1/1652 |

(Continued)

FOREIGN PATENT DOCUMENTS

| | | |
|---|---|---|
| CN | 107633186 A | 1/2018 |
| CN | 108376019 A | 8/2018 |

(Continued)

OTHER PUBLICATIONS

Extended European Search Reported related to Application No. 19903516.3; reported on Jan. 4, 2021.

(Continued)

*Primary Examiner* — Xi Wang
(74) *Attorney, Agent, or Firm* — von Briesen & Roper, s.c.

(57) ABSTRACT

A screen control method, a terminal, and a storage medium are provided. The terminal includes a screen and a camera, where the screen includes a movable first sub-screen, the camera is located below the first sub-screen, and the method includes: receiving a first instruction for enabling the camera, and controlling the first sub-screen to move so that the camera changes from a first state to a second state; or receiving a second instruction for disabling the camera, and controlling the first sub-screen to move so that the camera changes from the second state to the first state, where when in the first state, the camera is covered by the first sub-screen, and when in the second state, the camera is exposed out of the first sub-screen.

18 Claims, 8 Drawing Sheets

(56) References Cited

U.S. PATENT DOCUMENTS

2019/0302847 A1    10/2019  Chen et al.
2021/0160410 A1*    5/2021  Li ........................ G06F 1/1652

FOREIGN PATENT DOCUMENTS

| CN | 108377279 A | 8/2018 |
| CN | 108540608 A | 9/2018 |
| CN | 108600428 A | 9/2018 |
| CN | 108600453 A | 9/2018 |
| CN | 108881528 A | 11/2018 |
| CN | 109756594 A | 5/2019 |

OTHER PUBLICATIONS

International Search Report & Written Opinion related to Application No. PCT/CN2019/125025; reported on Jul. 8, 2021.
First Chinese Office Action for related Application No. 201811603117.3; reported on Jan. 10, 2020.

* cited by examiner

SCREEN CONTROL METHOD, TERMINAL, AND STORAGE MEDIUM

CROSS-REFERENCE TO RELATED APPLICATION

This application is continuation application of PCT International Application No. PCT/CN2019/125025 filed on Dec. 13, 2019, which claims priority to Chinese Patent Application No. 201811603117.3 filed in China on Dec. 26, 2018, the disclosures of which are incorporated herein by reference in their entireties.

TECHNICAL FIELD

Embodiments of the present disclosure relate to the field of terminals, and in particular, to a screen control method, a terminal, and a storage medium.

BACKGROUND

With the development of science and technologies and the progress of the times, more and more mobile phone manufacturers are in pursuit of mobile phones with larger screen-to-body ratios, to better meet the needs of consumers.

To increase screen-to-body ratios, many mobile phone manufacturers use bang screens or water drop screens (a drop-shaped "little bang" reserved at the top of a screen and user for disposing of a camera). However, due to the existence of a front-facing camera, a bang screen or a water drop screen is not a real full screen, and its relatively low screen-to-body ratio still affects its display effect.

SUMMARY

Embodiments of the present disclosure provide a screen control method, a terminal, and a storage medium.

According to a first aspect, a terminal is provided, where the terminal includes a screen, a camera, and a processor, the screen includes a movable first sub-screen, and the camera is located below the first sub-screen; and the processor is configured to: when receiving a first instruction for enabling the camera, control the first sub-screen to move so that the camera changes from a first state to a second state; and when receiving a second instruction for disabling the camera, control the first sub-screen to move so that the camera changes from the second state to the first state, where when in the first state, the camera is covered by the first sub-screen, and when in the second state, the camera is exposed out of the first sub-screen.

According to a second aspect, a screen control method applied to the terminal according to the foregoing embodiment, is provided, where the terminal includes a screen and a camera, the screen includes a movable first sub-screen, the camera is located below the first sub-screen, and the method includes:

receiving a first instruction for enabling the camera, and controlling the first sub-screen to move so that the camera changes from a first state to a second state; or receiving a second instruction for disabling the camera, and controlling the first sub-screen to move so that the camera changes from the second state to the first state, where when in the first state, the camera is covered by the first sub-screen, and when in the second state, the camera is exposed out of the first sub-screen.

According to a third aspect, a terminal is provided, including a processor and a memory, where the memory stores a computer program, and when the processor executes the computer program, steps of the method provided in the second aspect are implemented.

According to a fourth aspect, a computer-readable storage medium is provided, for example, a non-transitory computer-readable storage medium, where the computer-readable storage medium stores a computer program, and when the computer program is executed, steps of the method provided in the second aspect are implemented.

In the embodiments of the present disclosure, the camera is disposed below the movable first sub-screen of the terminal so that a bang or water drop area for disposing of the camera does not need to be reserved. In this way, the display area of the screen is greatly enlarged. Therefore, the screen-to-body ratio of the terminal is further increased. In addition, according to the under-screen camera solution provided in the embodiments of the present disclosure, the camera can be switched between the states only by controlling the movement of the first sub-screen. Therefore, the operation is convenient and fast, and the design complexity is relatively low.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

The following describes the technical solutions in various embodiments of the present disclosure in detail with reference to the accompanying drawings.

In this specification, it should be learned that "movable screen part" and "first sub-screen" are interchangeable and mean the same thing. In addition, "non-movable screen part" and "second sub-screen" are interchangeable and mean the same thing.

Figure 1:
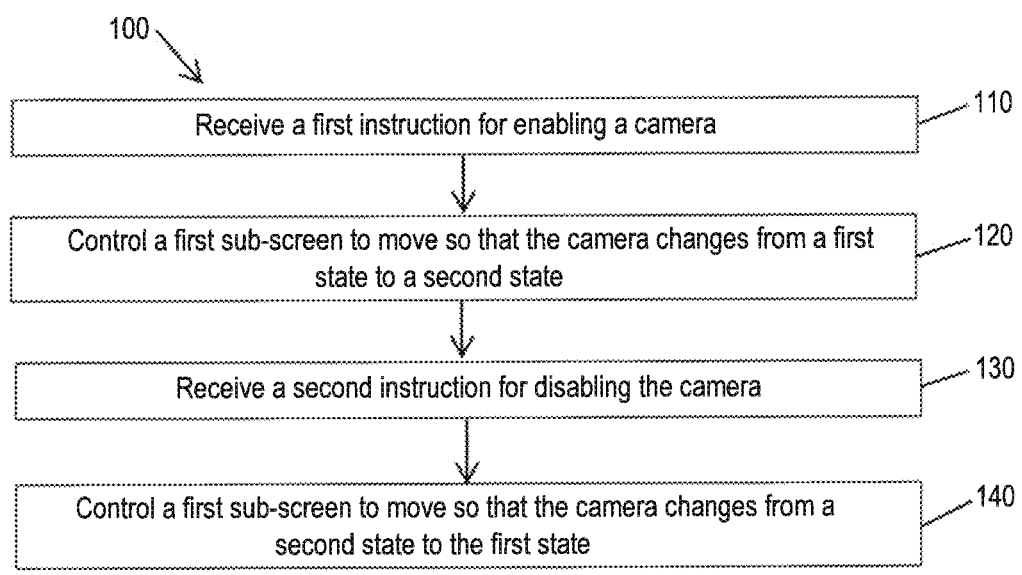
FIG. 1 is a flowchart of a screen control method according to an embodiment of the present disclosure.

FIG. 1 is a flowchart of a screen control method according to an embodiment of the present disclosure. Referring to FIG. 1, the screen control method provided in this embodiment of the present disclosure may be executed by a processor in a terminal. The terminal includes a screen (that is, a display screen) and a camera (for example, a front-facing camera), where the screen includes a movable first sub-screen (that is, a movable screen part), the camera may be located below the first sub-screen, and the method may include:

Step 110. Receive a first instruction for enabling the camera.

In this embodiment of the present disclosure, the terminal may be an electronic device such as a mobile phone or a tablet computer.

The terminal may include a mainboard. The screen and the camera may be connected to the mainboard. The processor may be disposed on the mainboard. Step 110 as well as Step 120 to Step 140 may be executed by the processor in the terminal.

In this embodiment of the present disclosure, the first instruction for enabling the camera may be triggered by such an operation that a user clicks an installed camera application or presses a shortcut key used for enabling the camera. Once the user enables the installed camera application or presses the shortcut key used for enabling the camera, the terminal can obtain the first instruction for enabling the camera.

Step 120. Control the first sub-screen to move so that the camera changes from a first state to a second state.

When the camera (for example, the front-facing camera) in the terminal is triggered (for example, triggered by such an operation that the user clicks the installed camera application or presses the shortcut key) for enabling, the processor in the terminal can learn that the camera needs to be enabled, and controls the movable screen part to move so that the camera changes from being covered or sheltered by the first sub-screen (that is, the movable screen part) to not being covered by the first sub-screen (the movable screen part).

In this embodiment of the present disclosure, when the terminal is in a screen-off state, the camera is in a state of being covered by the screen (that is, the movable first sub-screen) by default. When the terminal is switched from the screen-off state to a screen-on state, the camera can also be in the state of being covered by the screen (that is, movable first sub-screen) by default, provided that the camera is not enabled. In this case, the entire screen can be normally used for displaying. Once the camera is triggered for enabling, Step 120 may be performed to control the first sub-screen to move so that the camera changes from the first state to the second state.

When in the first state, the camera is covered by the first sub-screen, and when in the second state, the camera is exposed out of the first sub-screen. When in the second state, the camera can be enabled normally and can collect images. Quality of the images collected by the camera in the second state is relatively high because the camera is not covered by the first sub-screen.

Step 130. Receive a second instruction for disabling the camera.

In this embodiment of the present disclosure, when receiving the second instruction for exiting the camera from the user (for example, the user presses a return key or a homepage key), the terminal may disable (stop enabling) the camera.

Step 140. Control the first sub-screen to move so that the camera changes from the second state to the first state.

When the terminal disables (stops enabling) the camera, the processor may control the first sub-screen (the movable screen part) to move so that the camera changes from not being covered by the first sub-screen to being covered by the first sub-screen, that is, returns to the initial state.

In this embodiment of the present disclosure, the camera is disposed below the movable first sub-screen (that is, the movable screen part) of the terminal so that a bang or water drop area for disposing of the camera does not need to be reserved. In this way, the display area of the screen is greatly enlarged. Therefore, the screen-to-body ratio of the terminal is further increased. In addition, according to the under-screen camera solution provided in the embodiments of the present disclosure, the camera can be switched between the states only by controlling the movement of the first sub-screen. Therefore, the operation is convenient and fast, and the design complexity is relatively low.

In this embodiment of the present disclosure, the first sub-screen (the movable screen part) can be controlled to move in various manners so that the camera changes from the first state (being covered by the movable screen part) to the second state (that is, not being covered by the movable screen part) or from the second state (that is, not being covered by the movable screen part) to the first state (that is, being covered by the movable screen part).

For example, if the screen of the terminal is a flexible screen, the camera can be disposed on one side of the screen, for example, at the top or bottom of the screen, on the left or right side of the screen, or the like (the top, bottom, left site, right side herein are orientations described when the user faces the front side of the screen of the terminal). In this way, when the terminal is in the screen-off state, the camera can be in the state of being covered by the movable screen part by default. When the terminal is switched from the screen-off state to the screen-on state, the camera can also be in the state of being covered by the movable screen part of the flexible screen by default, provided that the camera is not enabled. In this case, the entire flexible screen can be fully utilized for displaying. Once the camera is triggered for enabling, the processor can control the movable screen part to bend or fold so that the camera changes from the first state (being covered by the movable screen part) to the second state (not being covered by the movable screen part). Herein, when the camera is disposed at the top or bottom or on the left or right side of the screen of the terminal, the movable screen part can bend or fold. Therefore, the camera is exposed and is not covered by the movable screen part any more.

Correspondingly, after the camera is used, or when enabling the camera needs to be stopped or disabling the camera is required, the movable screen part can be controlled to extend so that the camera changes from not being covered by the movable screen part to being covered by the movable screen part.

In this embodiment of the present disclosure, movement of the movable screen part may be realized under the action of a movable supporting component, and movement of the supporting component may be controlled by the processor.

Figure 2:
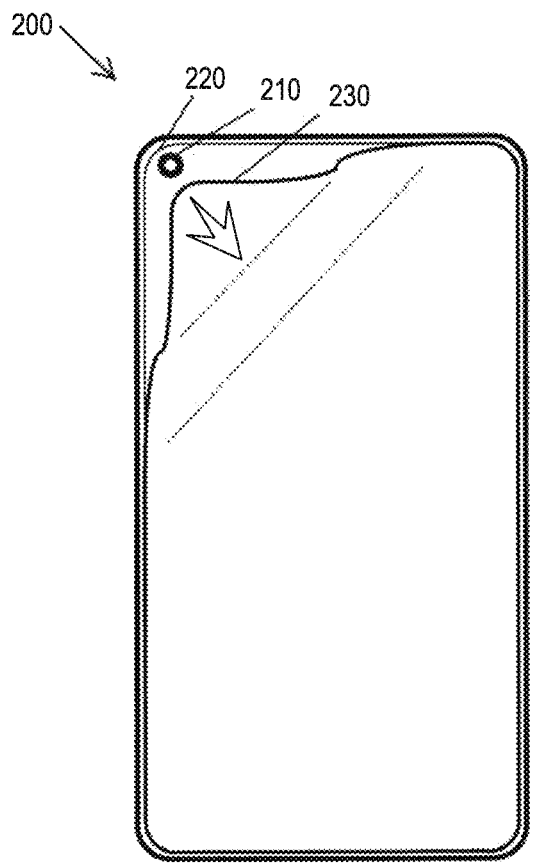
FIG. 2 is a schematic diagram of state changes of a flexible screen.

FIG. 2 is a schematic diagram of state changes of a flexible screen. Referring to FIG. 2, a camera 210 is disposed at the top of a terminal. When in an initial state, a movable screen part may be located at a position 220 where the camera 210 is covered. In this case, if the camera is not enabled, the entire flexible screen can display normally. When the camera is enabled, the movable screen part may be controlled to bend or fold to a position 230 where the camera 210 is not covered. In this case, the camera can be used normally. When enabling the camera is stopped, the movable screen part may be controlled to restore to the initial state, that is, move back from the position 230 to the position 220 where the camera 210 is covered. After the flexible screen returns to the position 220, the entire flexible screen can still be used normally for displaying in a screen-on state. In this way, before the camera is enabled, the screen can be fully utilized for displaying, thereby optimizing the display effect.

In addition, in this embodiment of the present disclosure, a front-facing camera is hidden under the movable screen part. Before the front-facing camera is enabled, the movable screen part is in an extended state. After the front-facing camera is enabled, the under-screen camera can be exposed by bending or folding a small part (that is, the movable screen part) of the flexible screen so that the under-screen camera can be used to collect images. After the front-facing camera is disabled, the first sub-screen that is in a bent or folded state can be restored to the extended state. This manner of controlling the flexible screen to move is simple to operate, and does not need excessive mobile phone components. Therefore, components of a mobile phone can be kept simple and integrated while a full-screen effect is achieved.

For another example, the screen of the terminal is a common screen. In this embodiment of the present disclosure, the screen can be divided into two parts that can be separated from each other. One part (that is, the first sub-screen) is controlled to move so that the camera changes from the first state (being covered by the movable screen part) to the second state (that is, not being covered by the movable screen part) or from the second state (that is, not being covered by the movable screen part) to the first state (that is, being covered by the movable screen part). In this case, besides the movable first sub-screen, the screen of the terminal may further include a fixed second sub-screen. The first sub-screen and the second sub-screen are disposed independently. When the camera is completely covered by the first sub-screen, the first sub-screen and the second sub-screen form a complete screen. The first sub-screen can be in various shapes. For example, it can be circular, rectangular, or rhombic. The camera can be initially covered by the first sub-screen. Specifically, when the terminal is in a screen-off state, the camera can be in the state of being covered by the first sub-screen by default. When the terminal is switched from the screen-off state to the screen-on state, the camera can also be in the state of being covered by the first sub-screen by default, provided that the camera is not enabled. In this case, the entire flexible screen can be fully utilized for displaying. Once the camera is triggered for enabling, a processor can control the first sub-screen to descend to a position below the inner surface of the second sub-screen, and control the first sub-screen to move below the inner surface of the second sub-screen so that the camera changes from the first state to the second state. Herein, it should be learned that, before the camera is enabled, the first sub-screen may be in a state of being aligned with the second sub-screen, and the two sub-screens form a complete display screen.

Correspondingly, after the camera is used, or when enabling the camera needs to be stopped, the processor can control the first sub-screen to move below the inner surface of the second sub-screen so that the camera changes from the second state to the first state. Then, the processor can control the first sub-screen to ascend to a position aligned with the second sub-screen. In this way, a complete display screen is formed.

This manner of switching the camera between the states via ascending, descending, and moving is simple to operate. The switching from the first state to the second state can be fast only by descending and moving the first sub-screen. The switching from the second state to the first state can be fast only by moving and ascending the first sub-screen. In addition, before the camera is enabled, the screen can be fully utilized for displaying, thereby optimizing the display effect.

In this embodiment of the present disclosure, the first sub-screen can be descended or ascended in various manners. For example, the terminal may include a driving device, and the processor can control the driving device to descend or ascend the first sub-screen and to drive the first sub-screen to perform various types of movement after the first sub-screen descends to the position below the inner surface of the second sub-screen. Herein, it should be learned that, "the inner surface of the second sub-screen" mentioned in this embodiment of the present disclosure indicates a surface, facing (near) the camera, of the second sub-screen. The outer surface of the second sub-screen is a surface, facing (near) a user, of the second sub-screen.

For another example, the first sub-screen can be disposed on a compressible component, where the compressible component is made of a compressible material and thicker than the second sub-screen. In this way, disposing the first sub-screen on the compressible component can prevent the first sub-screen from being damaged due to a direct movement of the first sub-screen. In addition, as the compressible component is thicker than the second sub-screen, it can be ensured that the first sub-screen can be located below the inner surface of the second sub-screen by adjusting the thickness of the compressible component.

In this embodiment of the present disclosure, the compressible component may be an elastic component (for example, a spring), an inflatable component, piezoelectric ceramics, or the like. Therefore, ascending and descending of the first sub-screen can be realized by adjusting the height of the compressible component. Correspondingly, the controlling the first sub-screen to descend to a position below the inner surface of the second sub-screen may include: controlling the compressible component to be compressed by a preset height so that the first sub-screen descends to the position below the inner surface of the second sub-screen; and the controlling the first sub-screen to ascend to a position aligned with the second sub-screen may include: controlling the compressible component to be decompressed by the preset height so that the first sub-screen ascends to the position aligned with the second sub-screen. In this way, the ascending and descending of the first sub-screen can be realized conveniently and fast by adjusting the height of the compressible component.

Specifically, when the compressible component is an elastic component, the thickness of the compressible component can be adjusted by adjusting elastic deformation; or when the compressible component is piezoelectric ceramics, its thickness can be adjusted by controlling a voltage provided for the piezoelectric ceramics. In an embodiment of the present disclosure, the controlling the first sub-screen to descend to a position below the inner surface of the second sub-screen may specifically be: reducing the thickness of the compressible component by controlling a voltage provided for the compressible component so that the first sub-screen is controlled to descend to the position below the inner surface of the second sub-screen. Correspondingly, the controlling the first sub-screen to ascend to a position aligned with the second sub-screen may specifically be: increasing the thickness of the compressible component by controlling the voltage provided for the compressible component so that the first sub-screen is controlled to ascend to be aligned with the second sub-screen. Due to this manner of controlling the thickness of the compressible component based on the voltage, the thickness of the compressible component can be controlled precisely.

It should be learned that, in this embodiment of the present disclosure, the compressible component may not be disposed, and the driving device is directly coupled with the first sub-screen and directly drives, under the control of the processor, the first sub-screen to perform movement (including descending, movement below the inner surface of the second sub-screen after the descending, and subsequent ascending), thereby reducing under-screen components. However, when the terminal includes the compressible component, and the first sub-screen is disposed on the compressible component, the driving device can be coupled with the compressible component and drive the compressible component under the control of the processor, so that the first sub-screen is driven to perform movement (including descending, movement below the inner surface of the second sub-screen after the descending, and subsequent ascending). In this way, damage to the first sub-screen can be avoided, and the movement of the first sub-screen can be controlled more conveniently, fast, and precisely.

Figure 3A:
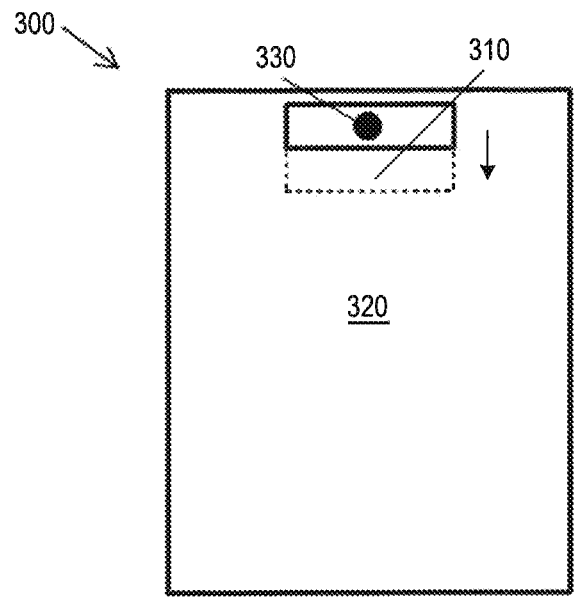
FIG. 3A is a schematic diagram of a first sub-screen that is rectangular and that moves linearly in a target direction.
Figure 3B:
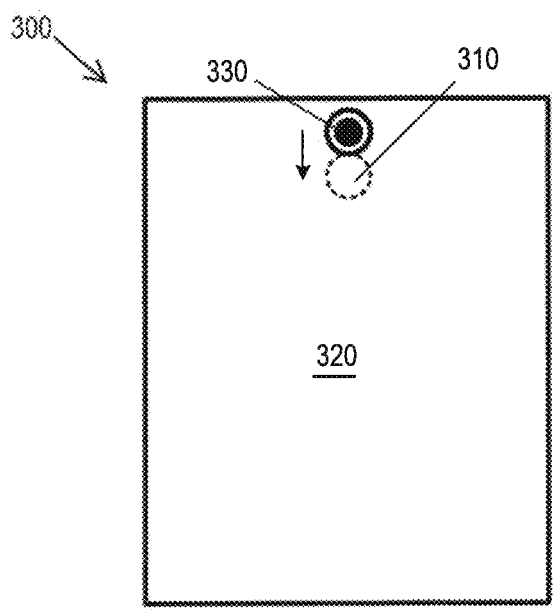
FIG. 3B is a schematic diagram of the first sub-screen that is circular and that moves linearly in a target direction.

In this embodiment of the present disclosure, the controlling the first sub-screen to move below the inner surface of the second sub-screen so that the camera changes from the first state to the second state may include: controlling the first sub-screen to move linearly below the inner surface of the second sub-screen in a first movement direction so that the camera changes from the first state to the second state. Correspondingly, the controlling the first sub-screen to move below the inner surface of the second sub-screen so that the camera changes from the second state to the first state may include: controlling the first sub-screen to move linearly below the inner surface of the second sub-screen in a second movement direction so that the camera changes from the second state to the first state, where the second movement direction is opposite to the first movement direction. Specifically, after the first sub-screen is driven to move to the position below the inner surface of the second sub-screen, the processor can control the first sub-screen to move linearly below the inner surface of the second sub-screen in the first movement direction so that the camera changes from the first state to the second state. When the movement of the first sub-screen is complete and the first sub-screen needs to return to an initial position, for example, after the camera is used, the processor can control the first sub-screen to move linearly below the inner surface of the second sub-screen in the second movement direction so that the camera changes from the second state to the first state, where the second movement direction is opposite to the first movement direction. For example, referring to FIGS. 3A to 3B, FIG. 3A is a schematic diagram of a first sub-screen that is rectangular and that moves linearly in a first direction, and FIG. 3B is a schematic diagram of a first sub-screen that is circular and that moves linearly in the first direction. As shown in FIG. 3A and FIG. 3B, if the first sub-screen 310 descends to a position below an inner surface of a second sub-screen 320, for example, descends linearly, after an under-screen camera 330 is used, the first sub-screen 310 can be controlled to ascend linearly in the original direction and further return to the position before the descending. Therefore, the first sub-screen can ascend from the position below the inner surface of the second sub-screen and further return to the position aligned with the second sub-screen. Therefore, a complete screen is formed again. In this way, the first sub-screen can apply to the linear movement scenario where it returns to the position before the descending via the linear movement, which enriches movement scenarios of the first sub-screen, and ensures that implementations are flexible and diversified.

Figure 4A:
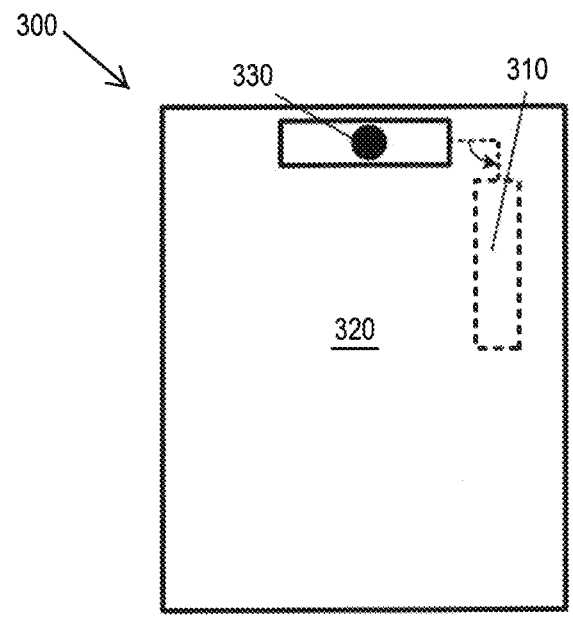
FIG. 4A is a schematic diagram of the first sub-screen that is rectangular and that moves rotationally in a rotational direction.
Figure 4B:
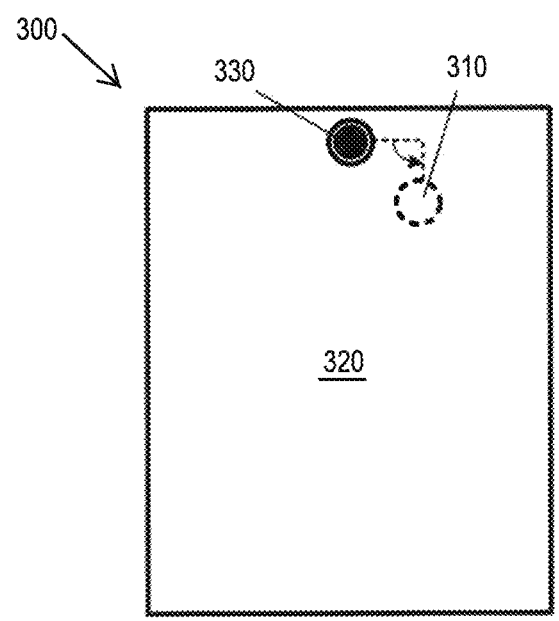
FIG. 4B is a schematic diagram of the first sub-screen that is circular and that moves rotationally in a rotational direction.

In this embodiment of the present disclosure, the controlling the first sub-screen to move below the inner surface of the second sub-screen so that the camera changes from the first state to the second state may include: controlling the first sub-screen to rotate below the inner surface of the second sub-screen in a first rotational direction so that the camera changes from the first state to the second state. Correspondingly, the controlling the first sub-screen to move below the inner surface of the second sub-screen so that the camera changes from the second state to the first state may include: controlling the first sub-screen to rotate below the inner surface of the second sub-screen in a second rotational direction so that the camera changes from the second state to the first state, where the second rotational direction is opposite to the first rotational direction. Specifically, after the first sub-screen is driven to move to the position below the inner surface of the second sub-screen, the processor can control the first sub-screen to rotate below the inner surface of the second sub-screen in the first rotational direction so that the camera changes from the first state to the second state. When the movement of the first sub-screen is complete and the first sub-screen needs to return to an initial position, for example, after the camera is used, the processor can control the first sub-screen to rotate below the inner surface of the second sub-screen in the second rotational direction so that the camera changes from the second state to the first state, where the second rotational direction is opposite to the first rotational direction. For example, referring to FIGS. 4A to 4B, FIG. 4A is a schematic diagram of a first sub-screen that is rectangular and that rotates in a first rotational direction, and FIG. 4B is a schematic diagram of a first sub-screen that is circular and that rotates in the first rotational direction. As shown in FIG. 4A and FIG. 4B, if the first sub-screen 310 descends to a position below an inner surface of a second sub-screen 320, for example, rotates in an anti-clockwise direction (for example, rotating 90°), after an under-screen camera 330 is used, the first sub-screen 310 can be controlled to rotate in a clockwise direction for the same angle (for example, rotating 90°) and further return to the position before the descending. Therefore, the first sub-screen can ascend from the position below the inner surface of the second sub-screen and further return to the position aligned with the second sub-screen. Therefore, a complete screen is formed again. In this way, the first sub-screen can apply to the rotational movement scenario where it returns to the position before the descending via the rotational movement, which enriches movement scenarios of the first sub-screen, and ensures that implementations are flexible and diversified.

Figure 5:
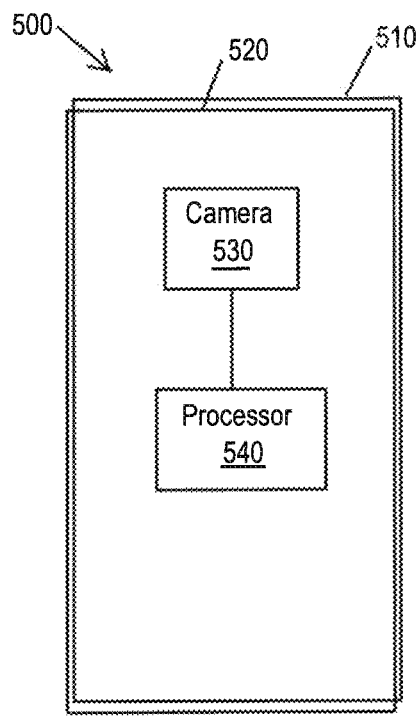
FIG. 5 is a structural block diagram of a terminal according to an embodiment of the present disclosure.

FIG. 5 is a structural block diagram of a terminal according to an embodiment of the present disclosure, where the terminal may be an electronic device such as a mobile phone or a tablet computer. Referring to FIG. 5, the terminal provided in this embodiment of the present disclosure may include a screen 510, a middle frame 520, a camera 530 and a processor 540. The camera 530 may be coupled with the middle frame 520, the screen includes a first sub-screen (that is, a movable screen part), and the camera 530 may be located below the first sub-screen.

The processor 540 may be configured to: when receiving a first instruction for enabling the camera, control the first sub-screen to move so that the camera changes from a first state to a second state; and when receiving a second instruction for disabling the camera, control the first sub-screen to move so that the camera changes from the second state to the first state, where when in the first state, the camera is covered by the first sub-screen, and when in the second state, the camera is exposed out of the first sub-screen.

The terminal may further include a mainboard (not shown in the figure). The mainboard may be disposed in the middle frame 520. The processor 540 may be disposed on the mainboard. The camera 530 may be connected to the mainboard.

In this embodiment of the present disclosure, the camera is disposed below the movable screen part of the terminal so that a bang or water drop area for disposing of the camera does not need to be reserved. In this way, the display area of the screen is greatly enlarged. Therefore, the screen-to-body ratio of the terminal is further increased. In addition, according to the under-screen camera solution provided in the embodiments of the present disclosure, the camera can be switched between the states only by controlling the movement of the first sub-screen. Therefore, the operation is convenient and fast, and the design complexity is relatively low.

Optionally, in an embodiment of the present disclosure, as shown in FIG. 2, the screen is a flexible screen, and the camera is disposed on one side of the screen. When controlling the first sub-screen to move so that the camera changes from the first state to the second state, the processor 540 may be specifically configured to: control the first sub-screen to be in a bent state or a folded state so that the camera changes from the first state to the second state. When controlling the first sub-screen to move so that the camera changes from the second state to the first state, the processor 540 may be specifically configured to: control the first sub-screen to change from the bent state or the folded state to an extended state so that the camera changes from the second state to the first state.

In this embodiment of the present disclosure, a front-facing camera is hidden under the movable screen part. Before the front-facing camera is enabled, the movable screen part is in an extended state. After the front-facing camera is enabled, the under-screen camera can be exposed by bending or folding a small part (that is, the movable screen part) of the flexible screen so that the under-screen camera can be used to collect images. After the front-facing camera is disabled, the first sub-screen that is in a bent or folded state can be restored to the extended state. This manner of controlling the flexible screen to move is simple to operate, and does not need excessive mobile phone components. Therefore, components of a mobile phone can be kept simple and integrated while a full-screen effect is achieved. In addition, according to the manner of controlling the flexible screen, before the camera is enabled, the screen can be fully utilized for displaying, thereby optimizing the display effect.

Optionally, in an embodiment of the present disclosure, as shown in FIG. 3A, the screen further includes a fixed second sub-screen, the first sub-screen and the second sub-screen are disposed independently, and when the camera is completely covered by the first sub-screen, the first sub-screen and the second sub-screen form a complete screen. When controlling the first sub-screen to move so that the camera changes from the first state to the second state, the processor 540 may be specifically configured to: control the first sub-screen to descend to a position below the inner surface of the second sub-screen, and control the first sub-screen to move below the inner surface of the second sub-screen so that the camera changes from the first state to the second state. When controlling the first sub-screen to move so that the camera changes from the second state to the first state, the processor 540 may be specifically configured to: control the first sub-screen to move below the inner surface of the second sub-screen so that the camera changes from the second state to the first state, and after the camera changes from the second state to the first state, control the first sub-screen to ascend to a position aligned with the second sub-screen. This manner of switching the camera between the states via ascending, descending, and moving is simple to operate. The switching from the first state to the second state can be fast only by descending and moving the first sub-screen. The switching from the second state to the first state can be fast only by moving and ascending the first sub-screen. In addition, before the camera is enabled, the screen can be fully utilized for displaying, thereby optimizing the display effect.

Optionally, in an embodiment of the present disclosure, the terminal further includes a compressible component, where the first sub-screen is disposed on the compressible component, and the compressible component is made of a compressible material and thicker than the second sub-screen. In this way, disposing the first sub-screen on the compressible component can prevent the first sub-screen from being damaged due to a direct movement of the first sub-screen. In addition, as the compressible component is thicker than the second sub-screen, it can be ensured that the first sub-screen can be located below the inner surface of the second sub-screen by adjusting the thickness of the compressible component.

Optionally, in an embodiment of the present disclosure, when controlling the first sub-screen to descend to the position below the inner surface of the second sub-screen, the processor 540 is specifically configured to: control the compressible component to be compressed by a preset height so that the first sub-screen descends to the position below the inner surface of the second sub-screen. When controlling the first sub-screen to ascend to the position aligned with the second sub-screen, the processor 540 may be specifically configured to: control the compressible component to be decompressed by the preset height so that the first sub-screen ascends to the position aligned with the second sub-screen. In this way, the ascending and descending of the first sub-screen can be realized conveniently and fast by adjusting the height of the compressible component.

Optionally, in an embodiment of the present disclosure, the compressible component is connected to a power supply circuit. When controlling the first sub-screen to descend to the position below the inner surface of the second sub-screen, the processor 540 may be specifically configured to:

reduce the thickness of the compressible component by controlling a voltage provided for the compressible component so that the first sub-screen is controlled to descend to the position below the inner surface of the second sub-screen. When controlling the first sub-screen to ascend to the position aligned with the second sub-screen, the processor 540 may be specifically configured to: increase the thickness of the compressible component by controlling the voltage provided for the compressible component so that the first sub-screen is controlled to ascend to be aligned with the second sub-screen. Due to this manner of controlling the thickness of the compressible component based on the voltage, the thickness of the compressible component can be controlled precisely.

Optionally, in an embodiment of the present disclosure, the terminal may further include a driving device, where the driving device is coupled with the first sub-screen and is configured to: under the control of the processor, drive the first sub-screen to move. In this embodiment of the present disclosure, when the driving device directly drives the first sub-screen to move, under-screen components can be reduced.

Optionally, in an embodiment of the present disclosure, the terminal may further include a driving device, where the driving device is coupled with the compressible component and is configured to: under the control of the processor, drive the compressible component to move so that the first sub-screen is driven to move. When the driving device drives the compressible component so that the first sub-screen is driven to move, damage to the first sub-screen can be avoided, and the movement of the first sub-screen can be controlled more conveniently, fast, and precisely.

Optionally, in another embodiment of the present disclosure, the terminal further includes a driving device, where the driving device includes a motor and a shaft, and the motor is fixed on the middle frame and is coupled with the shaft. The terminal further includes a bearing component, where the compressible component is disposed on the bearing component. The bearing component is coupled with the shaft, and can be fixedly connected to a shaft in various manners, such as welding, gluing, or a threaded manner through a hole formed in the bearing shaft. The terminal may further include a camera base, where the camera base is fixed on the middle frame, and the camera is fixed on the camera base. The motor drives the shaft to move when working, movement of the shaft drives the bearing component to move, and the compressible component and the first sub-screen are further driven to move. In this embodiment of the present disclosure, the compressible component is disposed on the bearing component, and is connected to the driving device via the bearing component so that the first sub-screen can be driven conveniently and fast on the premise that the first sub-screen and the compressible component are intact.

Optionally, in an embodiment of the present disclosure, the shaft is a rotating shaft, where the rotating shaft is connected to the motor via a coupling, an opening is formed in the bearing component, the rotating shaft is fixedly connected to the bearing component through the opening, and the movement of the rotating shaft is rotational movement. When the camera changes from the first state to the second state, movement of the first sub-screen below the inner surface of the second sub-screen is rotational movement in a first rotational direction. When the camera changes from the second state to the first state, the movement of the first sub-screen below the inner surface of the second sub-screen is rotational movement in a second rotational direction, and the second rotational direction is opposite to the first rotational direction. According to this embodiment of the present disclosure, through a specific structural design, the rotational movement of the rotating shaft triggered by the motor can be conveniently transferred to the bearing component so that the bearing component is driven to move rotationally. In this way, the rotational movement of the first sub-screen can be realized conveniently.

Herein, it should be learned that, the rotating shaft may be fixedly connected to the bearing component through the opening in various manners: threaded connection through the opening, interference fit, or the like. In addition, a reinforcing hole may also be formed in the bearing component (for example, in a side surface thereof). A screw can reinforce the connection between the rotating shaft and the bearing component through the reinforcing hole.

Optionally, in an embodiment of the present disclosure, the shaft is a rotary screw rod, where the rotary screw rod is connected to the motor via a coupling, and a screw nut is disposed on the rotary screw rod and fixedly connected to the bearing component. A guide rail is also disposed on the middle frame. The bearing component is on the guide rail and moves linearly along the guide rail under the action of the driving device. Movement of the rotary screw rod is rotational movement. When the camera changes from the first state to the second state, movement of the first sub-screen below the inner surface of the second sub-screen is linear movement in a first movement direction. When the camera changes from the second state to the first state, the movement of the first sub-screen below the inner surface of the second sub-screen is linear movement in a second movement direction, and the second movement direction is opposite to the first movement direction. According to this embodiment of the present disclosure, through a specific structural design, the rotational movement of the rotary screw rod triggered by the motor can be converted to linear movement of the screw nut so that the bearing component is driven to move linearly along the guide rail. In this way, the linear movement of the first sub-screen can be realized conveniently.

The following uses examples in which the first sub-screen performs the linear movement (for example, as shown in FIG. 3A and FIG. 3B) and the rotational movement (for example, as shown in FIG. 4A and FIG. 4B) after descending to the position below the inner surface of the second sub-screen respectively, to further describe the terminal provided in the embodiments of the present disclosure. It should be learned that, the following description is merely an example embodiment rather than a limitation.

Figure 6A:
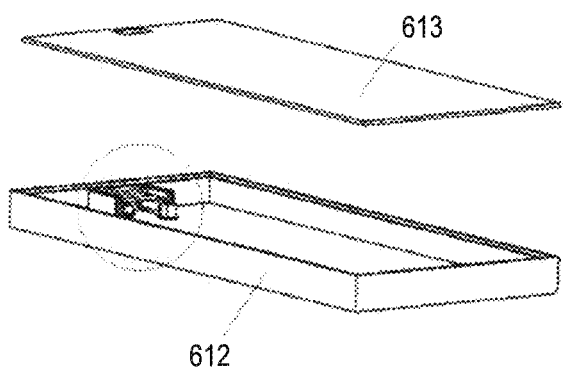
FIG. 6A is a schematic diagram of a terminal including the first sub-screen according to an embodiment of the present disclosure, where the first sub-screen moves linearly after descending to a position below the inner surface of a second sub-screen.
Figure 6B:
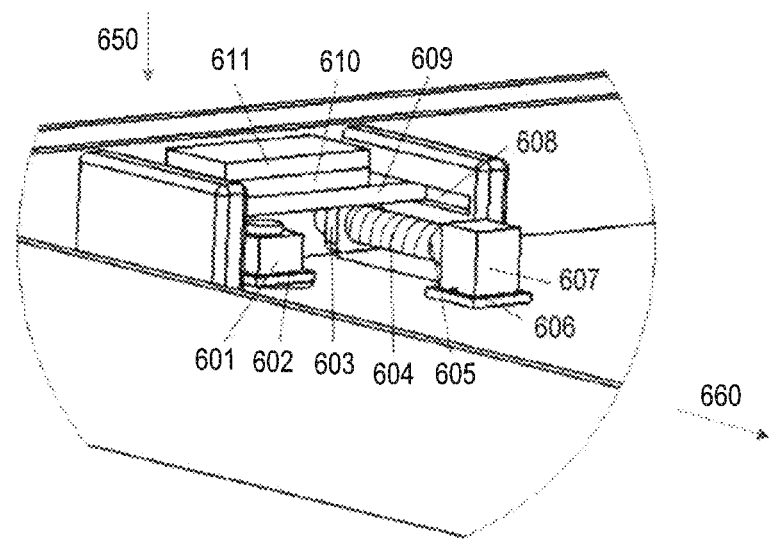
FIG. 6B is an enlarged view of a circled part in FIG. 6A.
Figure 6C:
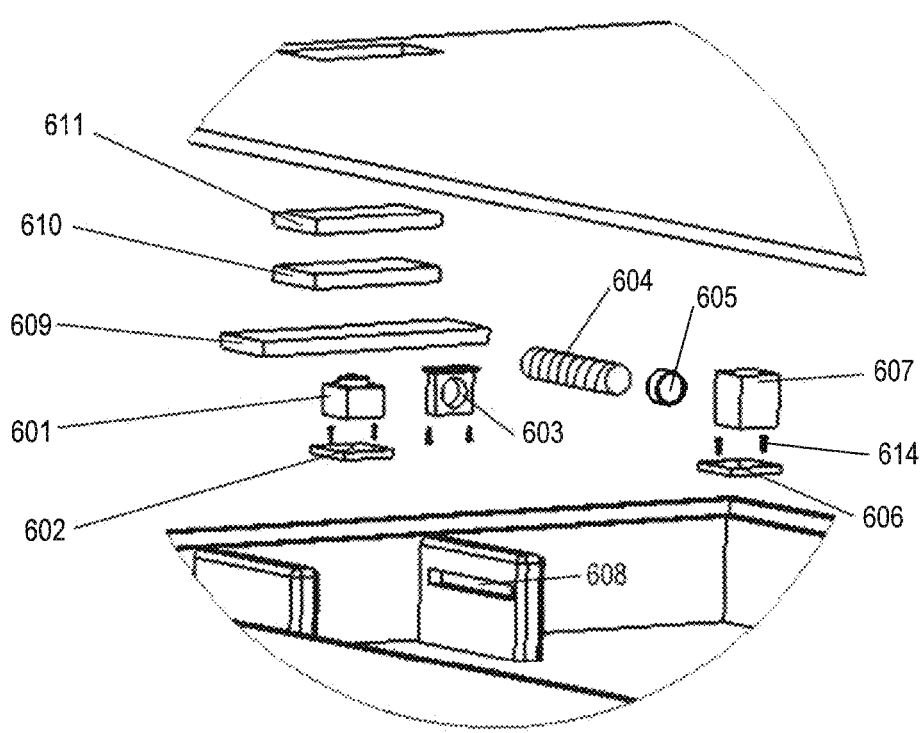
FIG. 6C is an enlarged view of each part in FIG. 6B.

FIG. 6A is a schematic diagram of a terminal including the first sub-screen according to an embodiment of the present disclosure, where the first sub-screen moves linearly after descending to a height lower than the second sub-screen. FIG. 6B is an enlarged view of a circled part in FIG. 6A. FIG. 6C is an enlarged view of each part in FIG. 6B.

Before an under-screen camera is enabled, the first sub-screen (that is, a movable screen part) and the second sub-screen (a fixed screen part) are spliced together, and can be fused for displaying via a screen splicing function of software, thereby achieving the display effect of one display screen. The front-facing under-screen camera is disposed below the first sub-screen. While the front-facing under-screen camera is enabled, the first sub-screen moves to a position below the inner surface of the second sub-screen for hiding, as shown in FIG. 3A or FIG. 3B. In addition, the screen splicing function can be disabled using the software. In this case, a single screen, namely, the second sub-screen, is used for displaying.

Referring to FIGS. 6A to 6C, an implementation for moving the first sub-screen to the position below the inner surface of the second sub-screen may be as follows: The terminal includes a mobile phone middle frame 612 and a second sub-screen (a fixed screen) 613. A first sub-screen 611 is located at an opening of the second sub-screen 613. An under-screen camera 601 is fixed on a camera base 602 (for example, using a screw 614). The camera base 602 is fixedly connected to the mobile phone middle frame 612 (for example, using the screw 614). The under-screen camera 601 may be under the opening of the second sub-screen 613. The first sub-screen 611 is fixedly connected to a compressible component 610 (for example, using glue). The compressible component 610 is connected to a bearing component (a moving platform) 609 (for example, using glue). Before the compressible component 610 is compressed, the first sub-screen 611 and the second sub-screen 613 are at the same height. The compressible component 610 can be compressed in a direction 650 shown in the figure via voltage controlling so that the first sub-screen 611 descends to a position below the second sub-screen 613. The bearing component 609 is located on a guide rail 608. The guide rail 608 is fixedly connected to the middle frame 612, for example, the guide rail 608 and the mobile phone middle frame 612 are integrally formed using a mold. A micro-motor 607 is fixedly connected to the mobile phone middle frame 612 via a motor base 606 (for example, using the screw 614). The micro-motor 607 is fixedly connected to a screw rod 604 via a coupling 605, and drives the screw rod 604 to rotate. When the motor 607 drives the screw rod 604 to move rotationally, the screw nut 603 moves transversally along the screw rod. The transversal movement of the screw nut 603 drives the bearing component 609 to move linearly. Therefore, under the action of the screw nut 603, the bearing component 609 can move transversally in a direction 660 shown in the figure so that the first sub-screen 611 moves to the position below the second sub-screen 613 and the under-screen camera 601 is exposed out.

In a single-screen display process, the under-screen camera can be used normally, for example, used for photo shooting or video recording. After the under-screen camera is used, if a user disables the under-screen camera 601 by disabling a shooting application, the micro-motor 607 is fixedly connected to the screw rod 604 via the coupling 605 and drives the screw rod 604 to rotate; and under the action of the screw nut 603, drives the bearing component 609 to move in a direction opposite to the direction 660 shown in the figure so that the bearing component 609 moves to the original position before descending. Then, the compressible component 610 is decompressed in a direction opposite to the direction 650 shown in the figure via voltage driving so that the first sub-screen 611 (the movable screen part) returns to be at the same height as the second sub-screen 613 (the fixed screen part). In this case, the screen splicing function can be enabled using the software so that the two screens are fused for displaying, thereby achieving the display effect of one display screen.

The screen of the terminal (for example, a mobile phone) provided in this embodiment of the present disclosure is obtained by splicing two screen parts: one is fixed, and the other one is movable. In this implementation, a front-facing camera is hidden under the movable screen. When the front-facing camera is not enabled, the two screen parts are fused for displaying via the splicing function. After the under-screen camera is enabled, the movable screen is moved to be hidden under the fixed screen, and the under-screen camera is used for collecting images and works in the single-screen mode. After the under-screen camera is disabled, the movable screen is moved to the original position, and the splicing function is enabled for fused displaying. In this implementation, the under-screen camera structure is realized by moving a small screen (the first sub-screen). Therefore, components of a mobile phone can be kept simple and integrated while a full-screen effect is achieved.

Figure 7A:
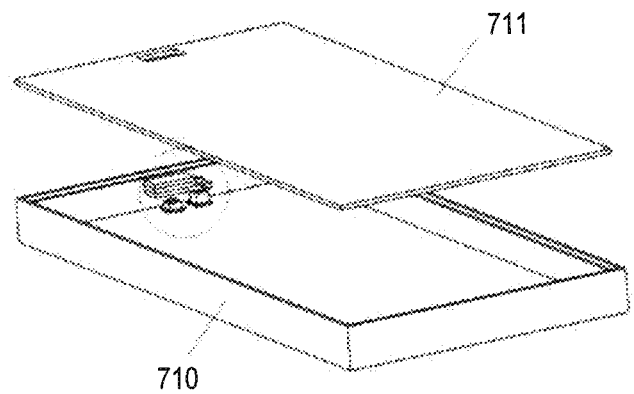
FIG. 7A is a schematic diagram of a terminal including the first sub-screen according to an embodiment of the present disclosure, where the first sub-screen moves rotationally after descending to a position below the inner surface of the second sub-screen.
Figure 7B:
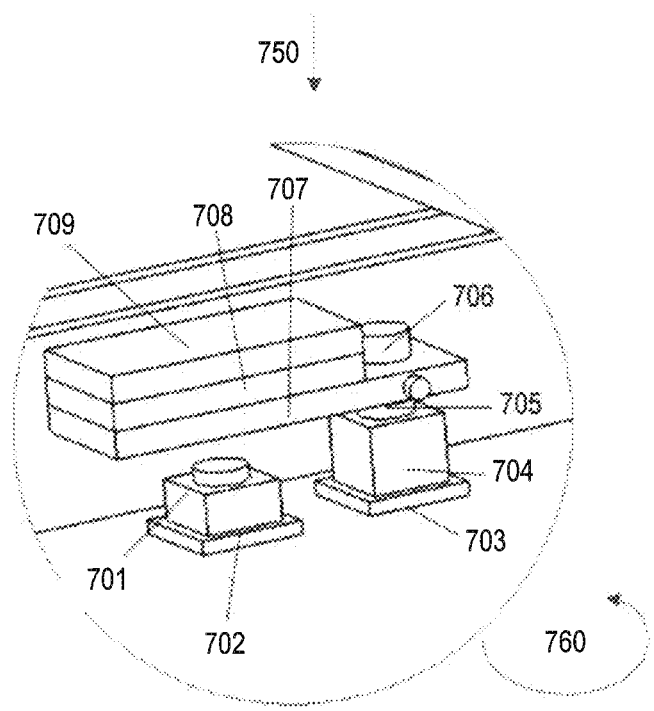
FIG. 7B is an enlarged view of a circled part in FIG. 7A.
Figure 7C:
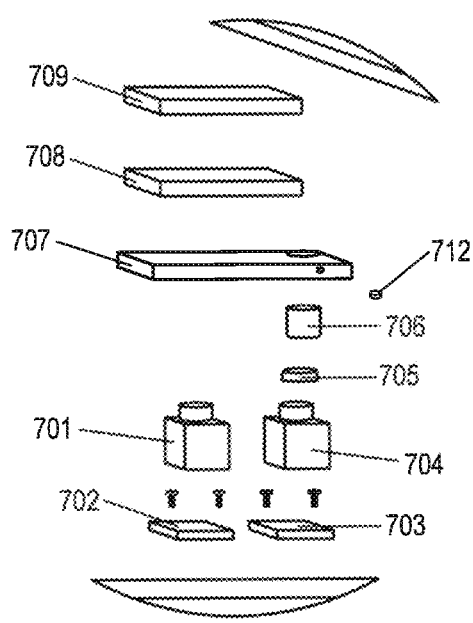
FIG. 7C is an enlarged view of each part in FIG. 7B.

FIG. 7A is a schematic diagram of a terminal including the first sub-screen according to an embodiment of the present disclosure, where the first sub-screen moves rotationally after descending to a height lower than a second sub-screen. FIG. 7B is an enlarged view of a circled part in FIG. 7A. FIG. 7C is an enlarged view of each part in FIG. 7B.

Before an under-screen camera is enabled, the first sub-screen (that is, a movable screen part) and the second sub-screen (a fixed screen part) are spliced together, and can be fused for displaying via a screen splicing function of software, thereby achieving the display effect of one display screen. The front-facing under-screen camera is disposed below the first sub-screen. While the front-facing under-screen camera is enabled, the first sub-screen moves to a position below the inner surface of the second sub-screen for hiding, as shown in FIG. 4A or FIG. 4B. In addition, the screen splicing function can be disabled using the software. In this case, a single screen, namely, the second sub-screen, is used for displaying.

Referring to FIGS. 7A to 7C, an implementation for moving the first sub-screen to the position below the inner surface of the second sub-screen may be as follows: The terminal includes a mobile phone middle frame 710 and a second sub-screen (a fixed screen) 711. A first sub-screen (a rotatable screen) 709 is located at an opening of the second sub-screen 711. An under-screen camera 701 is fixed on a camera base 702 (for example, using a screw 712). The camera base 702 is fixedly connected to the mobile phone middle frame 710 (for example, using the screw 712). The under-screen camera 701 may be under the opening of the second sub-screen 711. The first sub-screen 709 is fixedly connected to a compressible component 708 (for example, using glue). The compressible component 708 is connected to a bearing component (a moving platform) 707 (for example, using glue). Before the compressible component 708 is compressed, the first sub-screen 709 and the second sub-screen 711 are at the same height. The compressible component 708 can be compressed in a direction 750 shown in the figure via voltage controlling so that the first sub-screen 709 descends to a position below the second sub-screen 711. The bearing component 707 is connected to a rotating shaft 706, for example, is in interference fit with the rotating shaft 706 and fixed via the screw 712. A micro-motor 704 is fixedly connected to the mobile phone middle frame 710 via a motor base 703 (for example, using the screw 712). The micro-motor 704 is fixedly connected to the rotating shaft 706 via a coupling 705, and drives the rotating shaft 706 to rotate. In this way, the bearing component 707 is driven to rotate in a direction 760 shown in the figure so that the first sub-screen 709 rotates to the position below the second sub-screen 711 and the under-screen camera 701 is exposed out.

In a single-screen display mode, the under-screen camera can be used normally, for example, used for photo shooting or video recording. After the under-screen camera is used, if a user disables the under-screen camera 701 by disabling a shooting application, the micro-motor 704 is fixedly connected to the rotating shaft 706 via the coupling 705 and drives the rotating shaft 706 to rotate, thereby driving the bearing component 707 to rotate in a direction opposite to the direction 760 shown in the figure so that the bearing component 707 rotates to the original position. Then, the compressible component 708 is decompressed in a direction opposite to the direction 750 shown in the figure via voltage driving so that the first sub-screen 709 returns to be at the same height as the second sub-screen 711. In this case, the screen splicing function can be enabled using the software so that the two screens are fused for displaying, thereby achieving the display effect of one display screen.

The screen of the terminal (for example, a mobile phone) provided in this embodiment of the present disclosure is obtained by splicing two screen parts: one is fixed, and the other one is rotatable. In this implementation, a front-facing camera is hidden under the rotatable screen. When the front-facing camera is not enabled, the two screen parts are fused for displaying via the splicing function. After the under-screen camera is enabled, the rotatable screen is rotated to be hidden under the fixed screen, and the under-screen camera is used for collecting images and works in the single-screen mode. After the under-screen camera is disabled, the rotatable screen is rotated to the original position, and the splicing function is enabled for fused displaying. In this implementation, the under-screen camera solution is realized by moving a small screen (the first sub-screen). Therefore, components of a mobile phone can be kept simple and integrated while a full-screen effect is achieved.

It should be learned that, the terminal in this specification may be the terminal in the following description.

Figure 8:
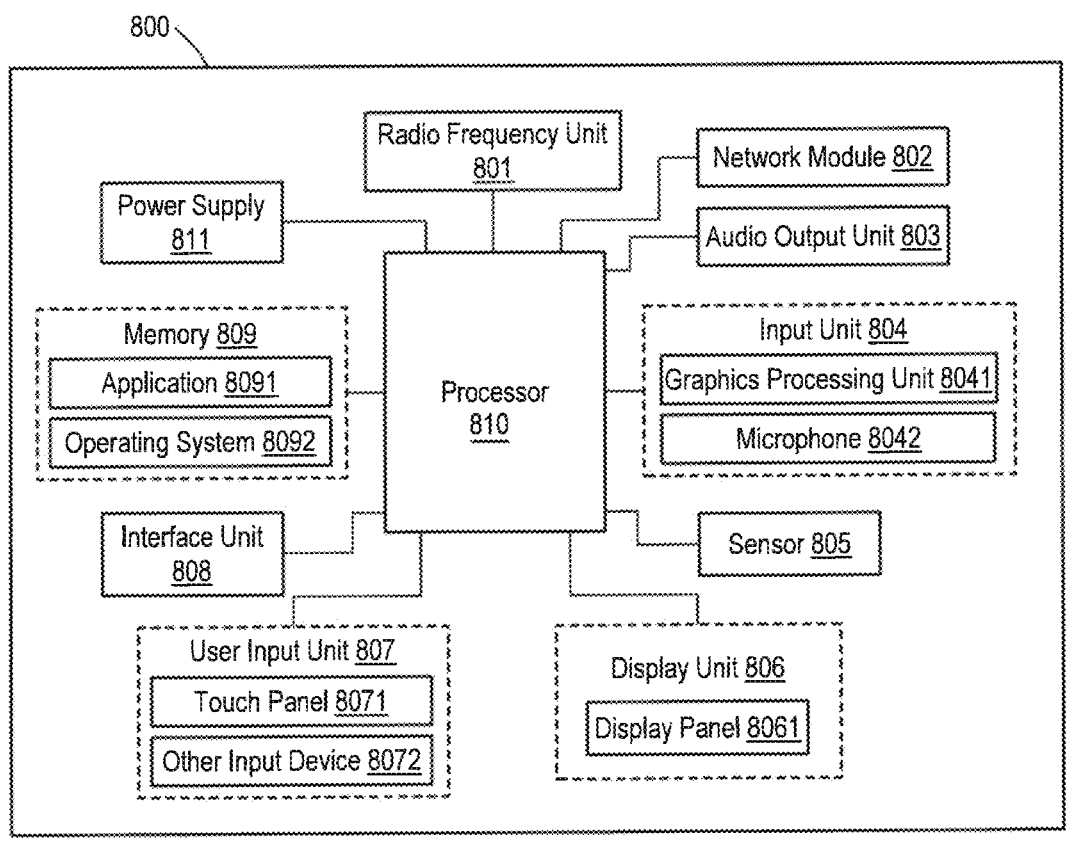
FIG. 8 is a schematic structural diagram of hardware of a terminal according to an embodiment of the present disclosure.

FIG. 8 is a schematic structural diagram of hardware of a terminal implementing embodiments of the present disclosure. The terminal 800 includes but is not limited to: a radio frequency unit 801, a network module 802, an audio output unit 803, an input unit 804, a sensor 805, a display unit 806, a user input unit 807, an interface unit 808, a memory 809, a processor 810, a power supply 811, and other components. Those skilled in the art may understand that the terminal structure shown in FIG. 8 does not constitute a limitation to the terminal. The terminal may include more or fewer components than those shown in the figure, or some components may be combined, or there may be a different component arrangement. In this embodiment of the present disclosure, the terminal includes but is not limited to: a mobile phone, a tablet computer, a notebook computer, a palmtop computer, or the like.

The processor 810 is configured to: in order to enable the camera, control a screen to move so that the camera changes from being covered by the screen to not being covered by the screen; and in order to disable the camera, control the screen to move so that the camera changes from not being covered by the screen to being covered by the screen.

It should be understood that, in this embodiment of the present disclosure, the radio frequency unit 801 may be configured to receive and send signals in an information receiving and sending process or a calling process. Specifically, after receiving downlink data from a base station, the radio frequency unit 801 sends the downlink data to the processor 810 for processing, and sends uplink data to the base station. Generally, the radio frequency unit 801 includes but is not limited to an antenna, at least one amplifier, a transceiver, a coupler, a low noise amplifier, a duplexer, and the like. In addition, the radio frequency unit 801 may further communicate with another device by using a wireless communications system and network.

The terminal provides a user with wireless broadband Internet access by using the network module 802, for example, helping the user send and receive emails, browse web pages, and access streaming media.

The audio output unit 803 may convert audio data received by the radio frequency unit 801 or the network module 802 or stored in the memory 809 into an audio signal and output the audio signal as a sound. In addition, the audio output unit 803 may further provide audio output (for example, call signal receiving sound or message receiving sound) related to a specific function performed by the terminal 800. The audio output unit 803 includes a loudspeaker, a buzzer, a receiver, and the like.

The input unit 804 is configured to receive audio or video signals. The input unit 804 may include a graphics processing unit (GPU) 8041 and a microphone 8042. The graphics processing unit 8041 processes image data of a static picture or video obtained by an image capture apparatus (such as a camera) in a video capture mode or an image capture mode. A processed image frame may be displayed on the display unit 806. The image frame processed by the graphics processing unit 8041 may be stored in the memory 809 (or another storage medium) or sent by using the radio frequency unit 801 or the network module 802. The microphone 8042 may receive a sound and can process such sound into audio data. Processed audio data may be converted, in telephone call mode, into a format that may be sent to a mobile communication base station via the radio frequency unit 801 for output.

The terminal 800 may further include at least one sensor 805, for example, a light sensor, a motion sensor, and another sensor. Specifically, the light sensor includes an ambient light sensor and a proximity sensor, where the ambient light sensor can adjust brightness of the display panel 8061 based on brightness of ambient light, and the proximity sensor can turn off the display panel 8061 and/or backlight when the terminal 800 is moved to an ear. As a type of the motion sensor, an accelerometer sensor may detect an acceleration value in each direction (generally, three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 805 may further include a fingerprint sensor, a pressure sensor, an iris sensor, a molecular sensor, a gyroscope, a barometer, a hygrometer, a thermometer, an infrared sensor, and the like. Details are not described herein.

The display unit 806 is configured to display information entered by a user or information provided for the user. The display unit 806 may include the display panel 8061, and the display panel 8061 may be configured in a form of a liquid crystal display (LCD), an organic light-emitting diode (OLED), or the like.

The user input unit 807 may be configured to receive input digit or character information and generate key signal input related to user setting and function control of the terminal. Specifically, the user input unit 807 includes a touch panel 8071 and another input device 8072. The touch panel 8071 is also referred to as a touchscreen, and may collect a touch operation performed by a user on or near the touch panel 8071 (such as an operation performed by a user on the touch panel 8071 or near the touch panel 8071 by using any proper object or accessory, such as a finger or a stylus). The touch panel 8071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 810, and can receive and execute a command sent by the processor 810. In addition, the touch panel 8071 can be implemented in various types such as resistive, capacitive, infrared, and surface acoustic waves. The user input unit 807 may further include other input devices 8072 in addition to the touch panel 8071. Specifically, the other input devices 8072 may include but are not limited to a physical keyboard, a function key (such as a volume control key or a power on/off key), a trackball, a mouse, a joystick, and the like. Details are not described herein.

Further, the touch panel 8071 may cover the display panel 8061. After detecting the touch operation on or near the touch panel 8071, the touch panel 8071 transmits the touch operation to the processor 810 to determine a type of a touch event, and then the processor 810 provides corresponding visual output on the display panel 8061 based on the type of the touch event. In FIG. 8, the touch panel 8071 and the display panel 8061 are used as two independent components to implement input and output functions of the terminal. However, in some embodiments, the touch panel 8071 and the display panel 8061 may be integrated to implement the input and output functions of the terminal. This is not specifically limited herein.

The interface unit 808 is an interface for connecting an external apparatus to the terminal 800. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 808 may be configured to receive an input (for example, data information or power) from an external apparatus and transmit the received input to one or more elements in the terminal 800, or transmit data between the terminal 800 and the external apparatus.

The memory 809 may be configured to store software programs and various data. The memory 809 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 809 may include a high-speed random access memory, and may further include a non-volatile memory such as at least one magnetic disk storage component, a flash memory component, or another volatile solid-state storage component.

The processor 810 is a control center of the terminal, and is connected to all parts of the entire terminal by using various interfaces and lines, and performs various functions of the terminal and processes data by running or executing the software program and/or the module that are stored in the memory 809 and invoking the data stored in the memory 809, to implement overall monitoring on the terminal. The processor 810 may include one or more processing units. Optionally, the processor 810 may be integrated with an application processor and a modem processor. The application processor mainly processes the operating system, the user interface, applications, etc. The modem processor mainly processes wireless communication. It can be understood that alternatively, the modem processor may not be integrated into the processor 810.

The terminal 800 may also include a power supply 811 (for example, a battery) that supplies power to various components. Optionally, the power supply 811 may be logically connected to the processor 810 through a power supply management system, to perform functions of managing charging, discharging, and power consumption through the power supply management system.

In addition, the terminal 800 includes some functional modules not shown. Details are not described herein again.

Optionally, an embodiment of the present disclosure further provides a terminal, including a processor 810, a memory 809, and a computer program that is stored in the memory 809 and that can run on the processor 810. When the computer program is executed by the processor 810, the steps of any one of the foregoing screen control methods can be implemented, and a same technical effect can be achieved. To avoid repetition, details are not described herein again.

According to the terminal provided in this embodiment of the present disclosure, the camera is disposed below the movable screen part of the terminal so that a bang or water drop area for disposing of the camera does not need to be reserved. In this way, the display area of the screen is greatly enlarged. Therefore, the screen-to-body ratio of the terminal is further increased. In addition, the under-screen camera solution provided in this embodiment of the present disclosure is convenient and fast to operate and relatively low in design complexity.

An embodiment of the present invention further provides a computer-readable storage medium. The computer-readable storage medium stores a computer program. When the computer program is executed by a processor, the steps of any one of the foregoing screen control methods are implemented, and a same technical effect can be achieved. To avoid repetition, details are not described herein again. The computer-readable storage medium may be a read-only memory (ROM), a random access memory (RAM), a magnetic disk, a compact disc, or the like.

According to the storage medium provided in this embodiment of the present disclosure, the camera is disposed below the movable screen part of the terminal so that a bang or water drop area for disposing of the camera does not need to be reserved. In this way, the display area of the screen is greatly enlarged. Therefore, the screen-to-body ratio of the terminal is further increased. In addition, the under-screen camera solution provided in this embodiment of the present disclosure is convenient and fast to operate and relatively low in design complexity.

A person skilled in the art should understand that the embodiments of the present disclosure may be provided as a method, an apparatus, or a computer program product. Therefore, the present disclosure may use a form of complete hardware embodiments, complete software embodiments, or software-hardware combined embodiments. Moreover, the present disclosure may use a form of a computer program product that is implemented on one or more computer-usable storage media (including but not limited to a magnetic disk memory, a CD-ROM, an optical memory, and the like) that include computer-usable program code.

The present disclosure are described with reference to the flowcharts and/or block diagrams of the methods, devices (systems), and computer program products according to the embodiments of the present disclosure. It should be understood that each process and/or block in the flowchart and/or block diagram as well as a combination of processes and/or blocks in the flowchart and/or block diagram may be implemented by computer program instructions. These computer program instructions may be provided to a processor of a general-purpose computer, a dedicated computer, an embedded processor, or another programmable data processing device to produce a machine, so that instructions executed by a processor of a computer or another programmable data processing device produce an apparatus for implementing a function specified in one or more processes of the flowchart and/or one or more blocks of the block diagram.

These computer program instructions may also be stored in a computer-readable memory that can instruct a computer or another programmable data processing device to work in a specific manner, so that an instruction stored in the computer-readable memory generates a product including an instruction apparatus, and the instruction apparatus implements a function specified in one or more processes of the flowchart and/or one or more blocks of the block diagram.

These computer program instructions may also be loaded onto a computer or another programmable data processing device, so that a series of operation steps are performed on the computer or the another programmable device to produce computer-implemented processing, thereby providing instructions executed on the computer or the another programmable device to implement the function specified in one or more processes of the flowchart and/or one or more blocks of the block diagram.

In a typical configuration, a computing device includes one or more processors (CPUs), input/output interfaces, network interfaces, and memories.

The memory may include a non-permanent memory, a random access memory (RAM), a non-volatile memory, and/or the like in a computer readable medium, such as a read-only memory (ROM) or a flash RAM. The memory is an example of the computer readable medium.

The computer readable medium includes permanent, non-permanent, removable, and non-removable media and can store information by using any method or technology. The information may be computer-readable instructions, data structures, modules of programs, or other data. Examples of the computer storage medium include but not limited to: a phase-change RAM (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a CD-ROM, a DVD or another optical memory, a magnetic cassette, a magnetic disk storage, another magnetic storage device, and any other non-transmission medium that may be used to store information that can be accessed by a computing device. As defined in this specification, the computer readable medium does not include computer readable transitory media, such as modulated data signals and carriers.

It should further be noted that, the terms "comprise", "include" and any other variants thereof are intended to cover non-exclusive inclusion, so that a process, a method, a commodity, or a device that includes a series of elements not only includes these very elements, but may also include other elements not expressly listed, or also include elements inherent to this process, method, commodity, or device. Without being subject to further limitations, an element defined by a phrase "including a/an . . . " does not exclude presence of other identical elements in the process, method, commodity, or device that includes the very element.

A person skilled in the art should understand that the embodiments of the present disclosure can be provided as a method, a system, or a computer program product. Therefore, the present disclosure may use a form of complete hardware embodiments, complete software embodiments, or software-hardware combined embodiments. Moreover, the present disclosure may use a form of a computer program product that is implemented on one or more computer-usable storage media (including but not limited to a magnetic disk memory, a CD-ROM, an optical memory, and the like) that include computer-usable program code.

The foregoing descriptions are merely embodiments of this disclosure, but are not intended to limit this disclosure. For a person skilled in the art, the present disclosure may have various changes and variations. Any modification, equivalent replacement, or improvement made without departing from the spirit and principle of this disclosure shall fall within the scope of claims of this disclosure.

The invention claimed is:

1. A terminal, comprising a screen, a camera and a processor, wherein
   the screen comprises a movable first sub-screen, wherein the camera is located below the first sub-screen; and
   the processor is configured to: when receiving a first instruction for enabling the camera, control the first sub-screen to move so that the camera changes from a first state to a second state; and when receiving a second instruction for disabling the camera, control the first sub-screen to move so that the camera changes from the second state to the first state, wherein
   when in the first state, the camera is covered by the first sub-screen, and when in the second state, the camera is exposed out of the first sub-screen;
   wherein the screen further comprises a fixed second sub-screen, the first sub-screen and the second sub-screen are disposed independently,
   and when the camera is completely covered by the first sub-screen, the first sub-screen and the second sub-screen form a complete screen;
   when controlling the first sub-screen to move so that the camera changes from the first state to the second state, the processor is specifically configured to: control the first sub-screen to descend to a position below an inner surface of the second sub-screen, and control the first sub-screen to move below the inner surface of the second sub-screen so that the camera changes from the first state to the second state; and
   when controlling the first sub-screen to move so that the camera changes from the second state to the first state, the processor is specifically configured to:
   control the first sub-screen to move below the inner surface of the second sub-screen so that the camera changes from the second state to the first state, and after the camera changes from the second state to the first state, control the first sub-screen to ascend to a position aligned with the second sub-screen.

2. The terminal according to claim 1, wherein the screen is a flexible screen, and the camera is disposed on one side of the screen;
   when controlling the first sub-screen to move so that the camera changes from the first state to the second state, the processor is specifically configured to: control the first sub-screen to be in a bent state or a folded state so that the camera changes from the first state to the second state; and
   when controlling the first sub-screen to move so that the camera changes from the second state to the first state, the processor is specifically configured to: control the first sub-screen to change from the bent state or the folded state to an extended state so that the camera changes from the second state to the first state.

3. The terminal according to claim 1, wherein the terminal further comprises a compressible component, and the first sub-screen is disposed on the compressible component;
when controlling the first sub-screen to descend to the position below the inner surface of the second sub-screen, the processor is specifically configured to: control the compressible component to be compressed by a preset height so that the first sub-screen descends to the position below the inner surface of the second sub-screen; and
when controlling the first sub-screen to ascend to the position aligned with the second sub-screen, the processor is specifically configured to: control the compressible component to be decompressed by the preset height so that the first sub-screen ascends to the position aligned with the second sub-screen.

4. The terminal according to claim 3, wherein the compressible component is made of a compressible material and thicker than the second sub-screen.

5. The terminal according to claim 1, wherein the terminal further comprises a driving device, and the driving device is coupled with the first sub-screen; and
the driving device is configured to: under the control of the processor, drive the first sub-screen to move.

6. The terminal according to claim 3, wherein the terminal further comprises a driving device, and the driving device is coupled with the compressible component; and
the driving device is configured to: under the control of the processor, drive the compressible component to move so that the first sub-screen is driven to move.

7. The terminal according to claim 3, wherein the terminal further comprises a driving device and a middle frame, the driving device comprises a motor and a shaft, and the motor is fixed on the middle frame and is coupled with the shaft;
the terminal further comprises a bearing component, wherein the compressible component is disposed on the bearing component, and the bearing component is coupled with the shaft;
the terminal further comprises a camera base, wherein the camera base is fixed on the middle frame, and the camera is fixed on the camera base; and
the motor drives the shaft to move when working, movement of the shaft drives the bearing component to move, and the compressible component and the first sub-screen are further driven to move.

8. The terminal according to claim 7, wherein the shaft is a rotating shaft, the rotating shaft is connected to the motor via a coupling, an opening is formed in the bearing component, the rotating shaft is fixedly connected to the bearing component through the opening, and the movement of the rotating shaft is rotational movement;
when the camera changes from the first state to the second state, movement of the first sub-screen below the inner surface of the second sub-screen is rotational movement in a first rotational direction; and
when the camera changes from the second state to the first state, the movement of the first sub-screen below the inner surface of the second sub-screen is rotational movement in a second rotational direction, and the second rotational direction is opposite to the first rotational direction.

9. The terminal according to claim 7, wherein the shaft is a rotary screw rod, the rotary screw rod is connected to the motor via a coupling, and a screw nut is disposed on the rotary screw rod and fixedly connected to the bearing component;
a guide rail is also disposed on the middle frame, and the bearing component is on the guide rail and moves linearly along the guide rail under the action of the driving device;
movement of the rotary screw rod is rotational movement;
when the camera changes from the first state to the second state, movement of the first sub-screen below the inner surface of the second sub-screen is linear movement in a first movement direction; and
when the camera changes from the second state to the first state, the movement of the first sub-screen below the inner surface of the second sub-screen is linear movement in a second movement direction, and the second movement direction is opposite to the first movement direction.

10. A screen control method, applied to a terminal, wherein the terminal comprises a screen and a camera, the screen comprises a movable first sub-screen, the camera is located below the first sub-screen, and the method comprises:
receiving a first instruction for enabling the camera; and
controlling the first sub-screen to move so that the camera changes from a first state to a second state; or
receiving a second instruction for disabling the camera; and
controlling the first sub-screen to move so that the camera changes from the second state to the first state, wherein when in the first state, the camera is covered by the first sub-screen, and when in the second state, the camera is exposed out of the first sub-screen;
wherein the screen further comprises a fixed second sub-screen, the first sub-screen and the second sub-screen are disposed independently, and when the camera is completely covered by the first sub-screen, the first sub-screen and the second sub-screen from a complete screen; the controlling the first sub-screen to move so that the camera changes from a first state to a second state comprises: controlling the first sub-screen to descend to a position below an inner surface of the second sub-screen, and
controlling the first sub-screen to move below the inner surface of the second sub-screen so that the camera changes from the first state to the second state; and
the controlling the first sub-screen
to move so that the camera changes from the second state to the first state comprises:
controlling the first sub-screen to move below the inner surface of the second sub-screen so that the camera changes from the second state to the first state, and after the camera changes from the second state to the first state, controlling the first sub-screen to ascend to a position aligned with the second sub-screen.

11. The method according to claim 10, wherein the screen is a flexible screen, and the camera is disposed on one side of the screen;
the controlling the first sub-screen to move so that the camera changes from a first state to a second state comprises:
controlling the first sub-screen to bend or fold so that the camera changes from the first state to the second state; and
the controlling the first sub-screen to move so that the camera changes from the second state to the first state comprises:

controlling the first sub-screen to extend so that the camera changes from the second state to the first state.

12. The method according to claim 10, wherein the first sub-screen is disposed on a compressible component, and the controlling the first sub-screen to descend to a position below the inner surface of the second sub-screen comprises:
controlling the compressible component to be compressed by a preset height so that the first sub-screen descends to the position below the inner surface of the second sub-screen; and
the controlling the first sub-screen to ascend to a position aligned with the second sub-screen comprises:
controlling the compressible component to be decompressed by the preset height so that the first sub-screen ascends to the position aligned with the second sub-screen.

13. The method according to claim 12, wherein the terminal further comprises a driving device, and the driving device is coupled with the first sub-screen or the compressible component;
the controlling the first sub-screen to move below the inner surface of the second sub-screen comprises:
controlling the driving device to drive the first sub-screen to move below the inner surface of the second sub-screen; or
controlling the driving device to drive the compressible component so that the first sub-screen is driven to move below the inner surface of the second sub-screen.

14. The method according to claim 10, wherein the controlling the first sub-screen to move below the inner surface of the second sub-screen so that the camera changes from the first state to the second state comprises:
controlling the first sub-screen to move linearly below the inner surface of the second sub-screen in a first movement direction, so that the camera changes from the first state to the second state; and
the controlling the first sub-screen to move below the inner surface of the second sub-screen so that the camera changes from the second state to the first state comprises:
controlling the first sub-screen to move linearly below the inner surface of the second sub-screen in a second movement direction so that the camera changes from the second state to the first state, wherein the second movement direction is opposite to the first movement direction.

15. The method according to claim 10, wherein the controlling the first sub-screen to move below the inner surface of the second sub-screen so that the camera changes from the first state to the second state comprises:
controlling the first sub-screen to rotate below the inner surface of the second sub-screen in a first rotational direction so that the camera changes from the first state to the second state; and
the controlling the first sub-screen to move below the inner surface of the second sub-screen so that the camera changes from the second state to the first state comprises:
controlling the first sub-screen to rotate below the inner surface of the second sub-screen in a second rotational direction so that the camera changes from the second state to the first state, wherein the second rotational direction is opposite to the first rotational direction.

16. A terminal, comprising a processor and a memory, wherein the memory stores a computer program,
wherein the terminal further comprises a screen and a camera, the screen comprises a movable first sub-screen, the camera is located below the first sub-screen,
when the processor executes the computer program, the processor is configured to implement following steps:
receiving a first instruction for enabling the camera; and
controlling the first sub-screen to move so that the camera changes from a first state to a second state; or
receiving a second instruction for disabling the camera; and
controlling the first sub-screen to move so that the camera changes from the second state to the first state, wherein
when in the first state, the camera is covered by the first sub-screen, and when in the second state, the camera is exposed out of the first sub-screen;
wherein the screen further comprises a fixed second sub-screen, the first sub-screen and the second sub-screen are disposed independently,
and when the camera is completely covered by the first sub-screen, the first sub-screen and the second sub-screen form a complete screen;
the controlling the first sub-screen to move so that the camera changes from the first state to the second state comprises:
controlling the first sub-screen to descend to a position below an inner surface of the second sub-screen, and controlling the first sub-screen to move below the inner surface of the second sub-screen so that the camera changes from the first state to the second state; and
when controlling the first sub-screen to move so that the camera changes from the second state to the first state comprises:
controlling the first sub-screen to move below the inner surface of the second sub-screen so that the camera changes from the second state to the first state, and after the camera changes from the second state to the first state, controlling the first sub-screen to ascend to a position aligned with the second sub-screen.

17. The terminal according to claim 16, wherein the screen is a flexible screen, and the camera is disposed on one side of the screen;
the controlling the first sub-screen to move so that the camera changes from a first state to a second state comprises:
controlling the first sub-screen to bend or fold so that the camera changes from the first state to the second state; and
the controlling the first sub-screen to move so that the camera changes from the second state to the first state comprises:
controlling the first sub-screen to extend so that the camera changes from the second state to the first state.

18. A non-volatile computer-readable storage medium, wherein the non-volatile computer-readable storage medium stores a computer program, and when a processor executes the computer program, steps of the method according to claim 10 are implemented.

* * * * *